(12) United States Patent
Yamaguchi et al.

(10) Patent No.: US 7,088,022 B2
(45) Date of Patent: Aug. 8, 2006

(54) AXIAL AIR-GAP VIBRATION MOTOR

(75) Inventors: Tadao Yamaguchi, Isesaki (JP);
Naohisa Koyanagi, Isesaki (JP);
Tetsushi Yashima, Isesaki (JP)

(73) Assignee: Tokyo Parts Industrial Co., Ltd., Isesaki (JP)

( * ) Notice: Subject to any disclaimer, the term of this patent is extended or adjusted under 35 U.S.C. 154(b) by 0 days.

(21) Appl. No.: 10/705,629

(22) Filed: Nov. 10, 2003

(65) Prior Publication Data
US 2005/0099074 A1    May 12, 2005

(51) Int. Cl.
*H02K 7/075* (2006.01)
(52) U.S. Cl. .................. 310/81; 310/268; 310/40 MM
(58) Field of Classification Search .................. 310/81, 310/89, 90, DIG. 6, 40 MM, 268
See application file for complete search history.

(56) References Cited

U.S. PATENT DOCUMENTS

| | | | | |
|---|---|---|---|---|
| 4,644,202 A | * | 2/1987 | Kroy et al. ..................... | 310/58 |
| 5,036,239 A | | 7/1991 | Yamaguchi .................. | 310/268 |
| 5,793,133 A | * | 8/1998 | Shiraki et al. ................. | 310/81 |
| 6,384,498 B1 | * | 5/2002 | Yamaguchi et al. .......... | 310/81 |
| 6,417,589 B1 | * | 7/2002 | Kuyama et al. ............... | 310/81 |
| 6,507,136 B1 | * | 1/2003 | Yamaguchi .................. | 310/128 |
| 6,600,245 B1 | * | 7/2003 | Yang et al. .................... | 310/71 |
| 6,608,410 B1 | * | 8/2003 | Sato et al. ................. | 310/67 R |
| 6,765,331 B1 | * | 7/2004 | Koyanagi et al. ............ | 310/268 |
| 2002/0047371 A1 | * | 4/2002 | Yamaguchi .................. | 310/81 |
| 2003/0015929 A1 | * | 1/2003 | Lee .............................. | 310/81 |

FOREIGN PATENT DOCUMENTS

| | | |
|---|---|---|
| JP | 8256449 | 10/1996 |
| JP | 2001-78407 | 3/2001 |
| JP | 2001-190052 | 7/2001 |
| JP | 2001-211624 | 8/2001 |
| JP | 2003-219602 | 7/2003 |

* cited by examiner

*Primary Examiner*—Dang Le
(74) *Attorney, Agent, or Firm*—Jordan and Hamburg, LLP

(57) ABSTRACT

A vibration motor has an eccentric rotor having a plurality of armature coils with at least one winding-type air core armature coil disposed in an eccentric manner on a printed wiring board. A commutator is disposed on the printed wiring board. An eccentric weight is disposed so as not to overlap with at least one winding-type air-core armature coil and at least two of the air-core armature coils overlap. A magnet imparts a magnet field to the eccentric rotor via an axial air gap, a brush that imparts electric power to the air-core armature coils via the commutator.

12 Claims, 5 Drawing Sheets

AXIAL AIR-GAP VIBRATION MOTOR

BACKGROUND OF THE INVENTION

1. Field of the Invention

The present invention relates to an improvement of an axial air-gap vibration motor comprising an eccentric rotor used as silent call means for a mobile communications device.

2. Description of the Prior Art

The Applicant has proposed in Japanese patent 2137724 (U.S. Pat. No. 5,036,239) a flat coreless vibration motor wherein three air-core armature coils are disposed eccentrically on one side, thereby causing a rotor contained therein to be eccentric, and no output shaft is provided.

Because much of the effective conductor length of the armature coils is used, this motor is comparatively efficient; with input of 3V, 8 mA of consumable power can easily be obtained. In addition, because there are no output shaft or eccentric weight and thus the motor is not subject to the corresponding design restrictions, it can be used in many ways, and, further, there is no danger during rotation; for these and other reasons the motor was well received by the market. On the other hand, because the motor has three air-core windings on one side, the coils necessarily have to be made small. For this reason, when such a motor is miniaturized, it is difficult to position the effective conductor portion of the coils at the pitch angle of magnetization for a magnet, which is a reference electrical angle.

Recently, as disclosed in Japanese Laid-open Patent Application 2001-211624, motors have been proposed such that three air-core armature coils of large, middle and small size are caused to overlap in the radial direction at the same position, so that the spatial phases of the coils are equal.

However, with such a configuration, unless the neutral zone of the magnet used is made large, there will be a portion generating reverse torque. Therefore, because a motor thus configured will have a magnet with a small effective cross-section area, its efficiency is not good.

In addition, as disclosed in Japanese Laid-open Patent Application 2001-190052, there is a motor wherein two air-core coils of large and middle size are caused to overlap in the radial direction at the same position, so that the spatial phases are equal, and in place of a small coil a resistor is inserted. However, because a resistor that makes no contribution to torque is inserted, efficiency is degraded.

Further, with a motor comprising an internal eccentric rotor where three armature coils are disposed on one side, as described above, the more such a motor is miniaturized, the smaller the intervals between the armature windings, and it becomes difficult to connect the terminal ends thereof to a rectifier in a manner that the armature windings are not damaged. In addition, because the armature coils must be made smaller than the pitch angle of magnetization of the magnet, which is a reference electrical angle, greater improvements in efficiency are desired.

SUMMARY OF THE INVENTION

It is an object of the present invention to provide a flat vibration motor with few parts and resulting cost efficiency, by welding a shaft to a casing to make a fixed-shaft type motor, so that it not only appropriately generates vibrations through centrifugal force but is also efficient and easy to assemble and so that large vibrations are obtained by the skillful disposition of an eccentric weight.

To achieve this object, a first aspect of the present invention comprises a printed wiring board on a first surface of which a commutator is disposed, a shaft holder made of resin is integrally formed on a second surface, and a plurality of armature coils having at least one winding-type air core armature coil is disposed in an eccentric manner in the radial direction on the outside of this resin holder; one sintered oil-impregnated bearing contained in the shaft holder; an eccentric weight disposed so as not to overlap with at least one winding-type air-core armature coil;

an eccentric rotor comprising a connector terminal part formed on the first surface of the printed wiring board so as not to overlap with the air-core armature coils; a shaft fixed by laser welding beforehand to the casing from the outside so that a first end does not project outside of a housing; a magnet that imparts a magnet field to the eccentric rotor via an axial air gap; a brush that imparts electric power to the air-core armature coils via the commutator; and a housing comprising the casing and a bracket and containing the aforementioned; wherein after the eccentric rotor is mounted on the shaft so as to be rotatable, a second end of the shaft is received and stopped by the bracket and prevented from moving in the radial direction.

Specifically, as in a second aspect of the present invention, a step portion may be formed on the casing and this step portion and the first end of the shaft are laser welded, so that the first end of the shaft does not protrude from the housing.

More specifically, as in a third aspect of the present invention, the second end of the shaft may be laser welded to the bracket from the outside.

According to the first aspect of the present invention, a vibration motor can be obtained such that vibrations are made large because the weight, which is a supplementary means, causes the center-of-gravity movement to be further weighted to one side; connecting the terminal ends of the air-core armature coils is facilitated by a connector that does not overlap with the air-core armature coils; the output shaft does not protrude, thereby allowing the motor to be thin; heat damage to the contained eccentric rotor can be prevented by laser welding one end of the shaft to the casing prior to mounting the eccentric rotor to the casing, as opposed to welding afterwards; a right angle can be maintained between the shaft and casing ceiling by means of a jig; and the fixing strength of the shaft is made large, incorporation of the rotor becomes simple, and one bearing is sufficient.

According to the second aspect of the present invention, the step portion enables the laser-welded portion not to protrude outside of the housing.

According to the third aspect of the present invention, a monocoque construction is achieved, improving impact resistance.

DETAILED DESCRIPTION OF THE PREFERRED EMBODIMENTS

Figure 1:
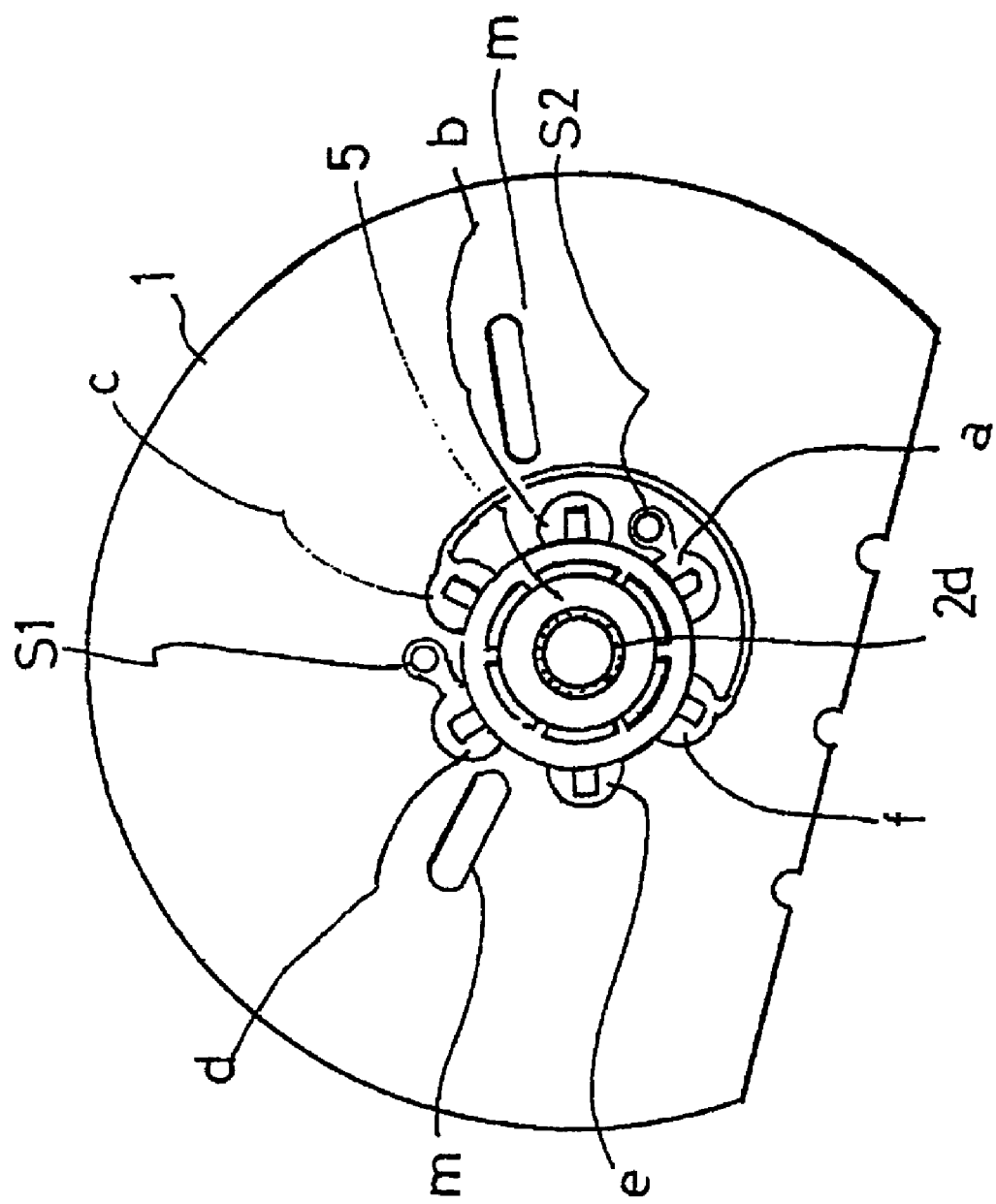
FIG. 1 is a plan view as seen from the rectifier of the eccentric rotor, showing an embodiment of the present invention.

The constitution of the present invention will be explained based on the embodiment shown in the drawings.

Figure 2:
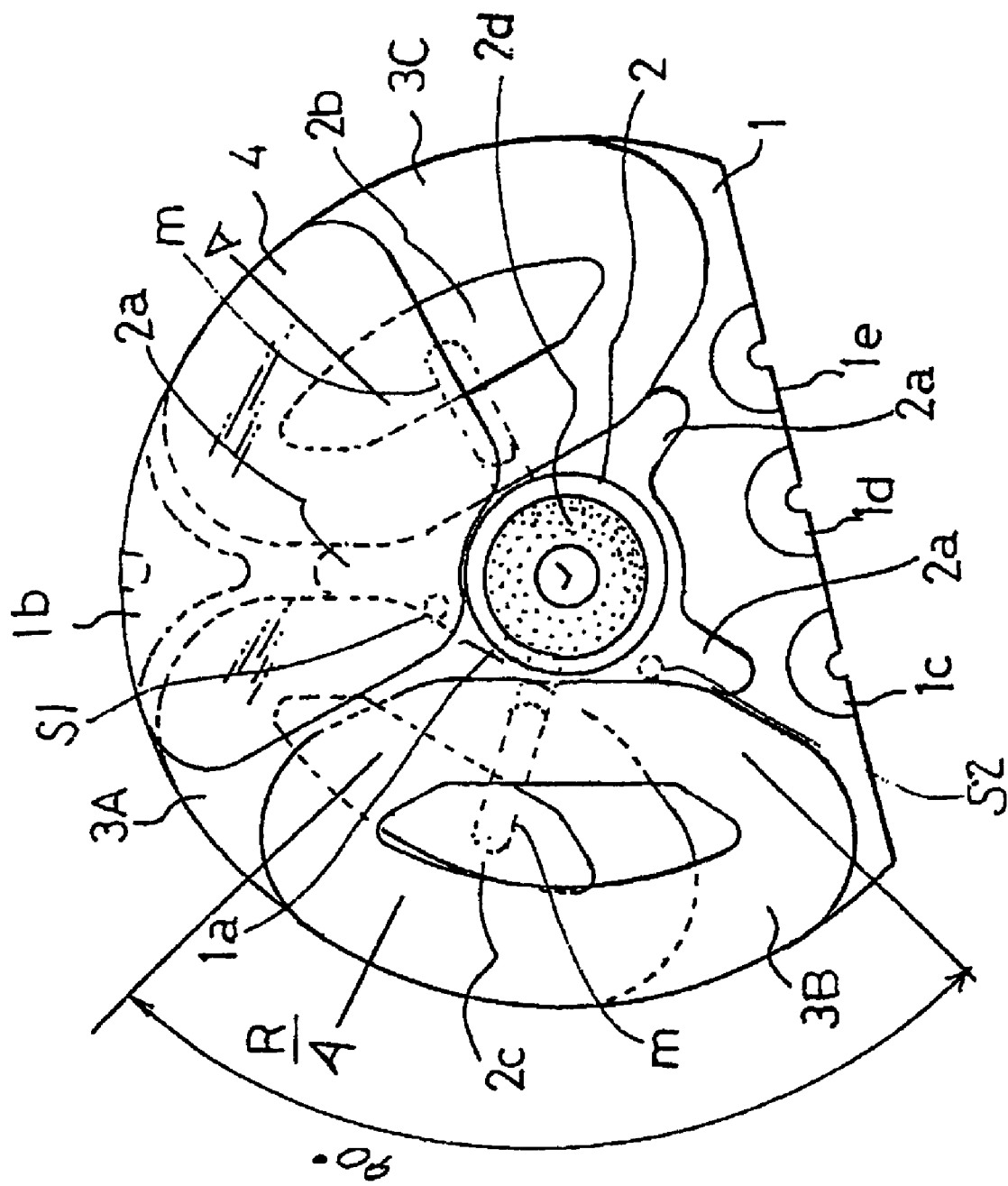
FIG. 2 is a plan view as seen from the side opposite the eccentric rotor rectifier.

In FIGS. 1 and 2, 1 is a rectifier member made of a printed wiring board with a thickness of 0.15 with copper foil formed on both sides; in the center thereof a shaft passage hole is provided, and the external shape, when seen from a plan view, is an oval from which a portion has been cut away.

One side of the printed wiring board 1 has six commutator connection segment lands (a), (b), (c), (d), (e) and (f), and opposing segments are shorted by, for example, through holes S1, S2 and a pattern provided on the other side of the printed wiring board 1.

On the other side of this rectifier member 1, a resin shaft holder 2 is integrally provided in the center thereof, and an air-core disposition guide 2a is formed extending in three radial directions from this shaft holder 2.

On this other side, air-core armature disposition inner diameter guides 2b, 2c are provided with, for example, a groove (m) formed on the printed wiring board interposing, and using the air-core armature disposition inner diameter guide 2b, a first winding-type air-core armature coil 3A is disposed thereon such that the effective conductive portion central space (in the radial direction of the rectifier member) has a pitch angle of substantially 90° (equal to the pitch angle of magnetization of the magnet). A second winding-type air-core armature coil 3B (being the same type as the first winding-type air-core armature coil 3A) is disposed with pitch angle shifted roughly 30° to the left so as to overlap the first winding-type air-core armature coil 3A.

Further, using the air-core armature disposition inner diameter guide 2c, a third winding-type air-core armature coil 3C (being the same type as the first winding-type air-core armature coil 3A) is disposed at a position separated roughly 120° in pitch angle from the first winding-type air-core armature coil 3A.

An eccentric weight 4 made from a tungsten ally is disposed so as to bridge the first winding-type air-core armature coil 3A and the third winding-type air-core armature coil 3C and so as not to protrude in the axial direction beyond the second winding-type air-core armature coil 3B; the eccentric weight 4 is integrally formed with the rectifier member 1 with an adhesive or other type of resin.

Either of the air-core disposition guide 2a unitarily extending in three radial directions from the shaft holder 2 or the air-core armature coil disposition inner diameter guides 2b, 2c can be omitted.

Here, the degree to which the first winding-type air-core armature coil 3A and the second winding-type air-core armature coil 3B are shifted relative to each other is set at 30°, but this can be set anywhere between 15° and 60°. When shifted 60° and made to overlap, the first and third winding-type air-core armature coils are in positions that are 180° opposite, meaning that the centers of gravity and centers of these two coils match; thus to supply the eccentricity, the eccentric weight needs to be made large.

On the other side of the rectifier comprising a printed wiring board thus constituted, a winding ending terminal bundling connector land 1b is formed on the outer peripheral portion between the first and second air-core armature coils, and winding beginning terminal connector lands 1c, 1d and 1e are formed on the opposite side, with the shaft pass-through hole therebetween. These winding beginning terminal connector lands 1c, 1d and 1e are connected to the aforementioned six rectifier connection segment lands (a), (b), (c), (d), (e) and (f) formed on the first side, via, for example, through holes S1, S2 opened at prescribed locations.

The winding beginning terminals of the winding-type air-core armature coils are connected by, for example, soldering, to the winding beginning terminal connector lands 1c, 1d and 1e, and the winding ending terminals of the coils are all connected by, for example, soldering, to the winding ending terminal bundling connector land 1b.

A six-pole tubular commutator 5 is attached to one side of the printed wiring board 1 by, for example, soldering terminal ends thereof to the six commutator connection segment lands (a), (b), (c), (d), (e) and (f), and further, on the other side, one oil-impregnated bearing 2d is embedded in the shaft holder 2; thus an eccentric rotor R is constituted.

Here, in order to make the eccentricity large, there is fixed an eccentric weight 4 made from a copper-tungsten alloy with a specific gravity of 13 or an eccentric weight 4 comprising copper-tungsten alloy particles bound in a polyamide resin, so as to weigh upon the first and second air-core armature coils.

The eccentric weight 4 may be a copper-tungsten alloy block with a high specific gravity, or it may be copper-tungsten alloy particles bound in a polyamide resin.

Figure 3:
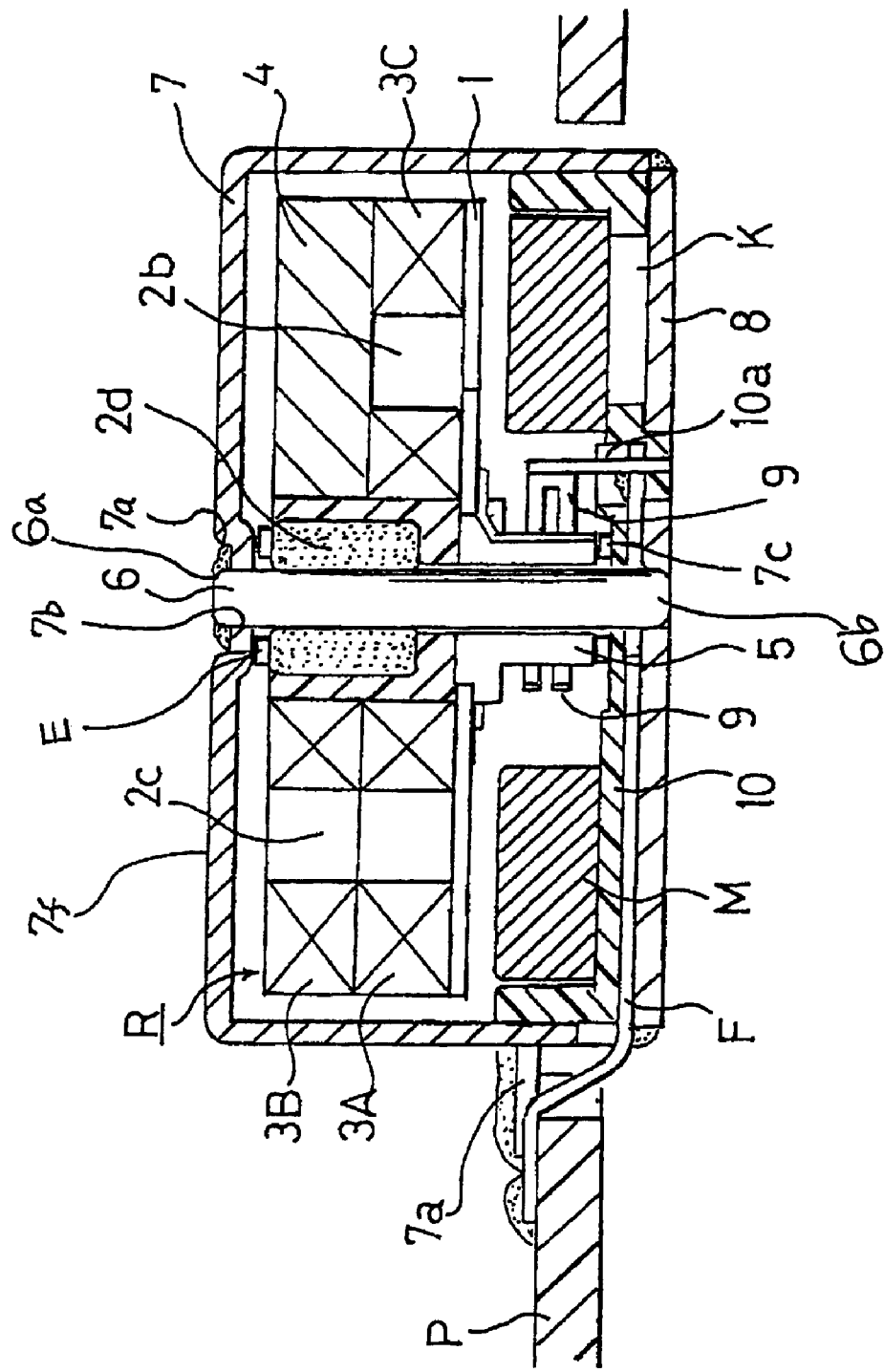
FIG. 3 is a longitudinal sectional view cut along the A—A line of a flat vibration motor according to the present invention incorporating the rotor of FIG. 2.

FIG. 3 shows a flat vibration motor comprising the eccentric rotor of FIGS. 1 and 2. This vibration motor has a fixed shaft, and thus is a fixed-shaft type.

This flat vibration motor has a housing comprising a bracket 8 and casing 7; ends 6a and 6b of a shaft 6 are fixed to the housing.

The bracket 8 is formed in a disk shape and the casing 7 is formed as a flat cylindrical cap, and outer periphery of the bracket 8 and opening end side of the casing 7 are fixed by, for example, welding at a plurality of locations.

Regarding the shaft 6 that rotatable supports the eccentric rotor R, a first end 6a is inserted into a shaft insertion hole 7b provided on the casing 7, and is fixed to the casing 7 from the outside by, for example, laser welding. The shaft insertion hole 7b is provided on a step portion 7a formed in the center of the upper surface part 7f. The first end 6a of the shaft 6 is welded within the step range of the step 7a, and does not protrude beyond the outer surface of the casing 7.

Figure 5:
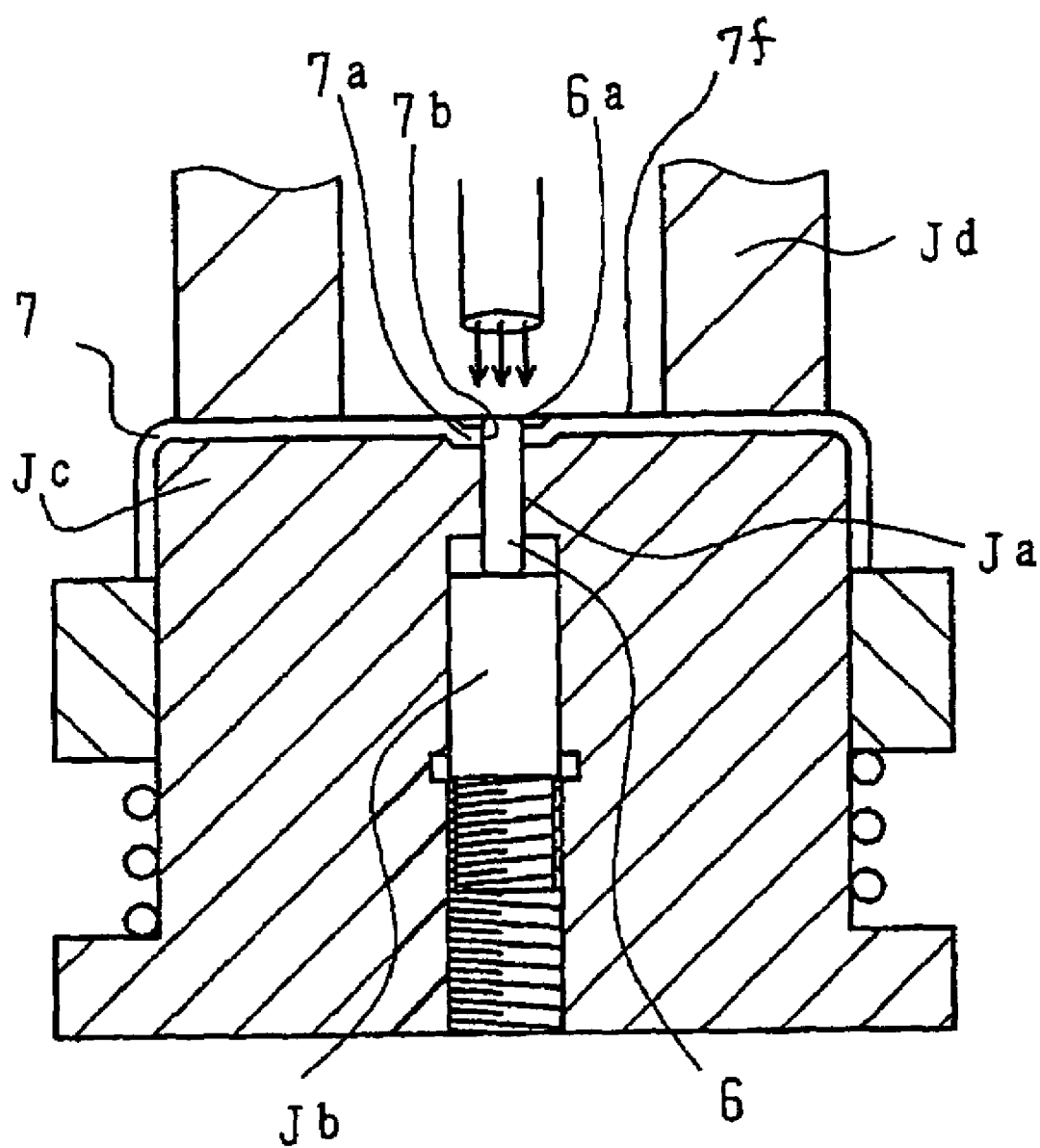
FIG. 5 is a drawing of the assembling of the casing and shaft constituting the motor.

In welding the shaft 6 to the casing 7, a jig J as shown in FIG. 5 is used and the casing 7 is first welded. More specifically, the shaft 6 is inserted in a shaft guide hole Ja of the jig J, and the casing 7 is made to cover a casing receiving part Jc so that the first shaft end 6a is inserted into the shaft insertion hole 7b. Thereafter, the casing 7 and shaft 6 are fixed to each other by laser welding from the outside the first end 6a of the shaft 6. The height of the shaft 6 with respect to the casing 7 is kept constant by the position regulator Jb, and the right angle between the shaft 6 and the upper surface part 7f of the casing 7 is maintained with sufficient accuracy by the shaft guide hole Ja, casing receiving part Jc and casing restraint Jd.

A second end 6b of the shaft 6 is inserted into a center hole 8a of the bracket 8.

In cases where simple insertion of the second end 6b of the shaft 6 into the bracket 8 will not be sufficiently strong, after the casing 7 and the bracket 8 are combined, the shaft 6 may be fixed to the bracket 8 by laser welding from the outside.

Thus the housing together with the shaft 6 has an overall monocoque construction, leading to improved impact resistance.

On this bracket 8, a brush base 10 on which brushes 9, 9 are provided is attached to a brush holder 10*a*. The brushes 9, 9 are in sliding contact with the tubular commutator 5.

This brush base 10 is provided on the bracket 8 by, for example, outset molding, with a power supply sheet F, which comprises a flexible substrate, interposed therebetween; further, disposed on an upper portion thereof is a doughnut-shaped heat resistant rare earth magnet M magnetized so as to have four alternating north and south poles N and S. This magnet M opposes the eccentric rotor R with an axial air gap therebetween.

Figure 4:
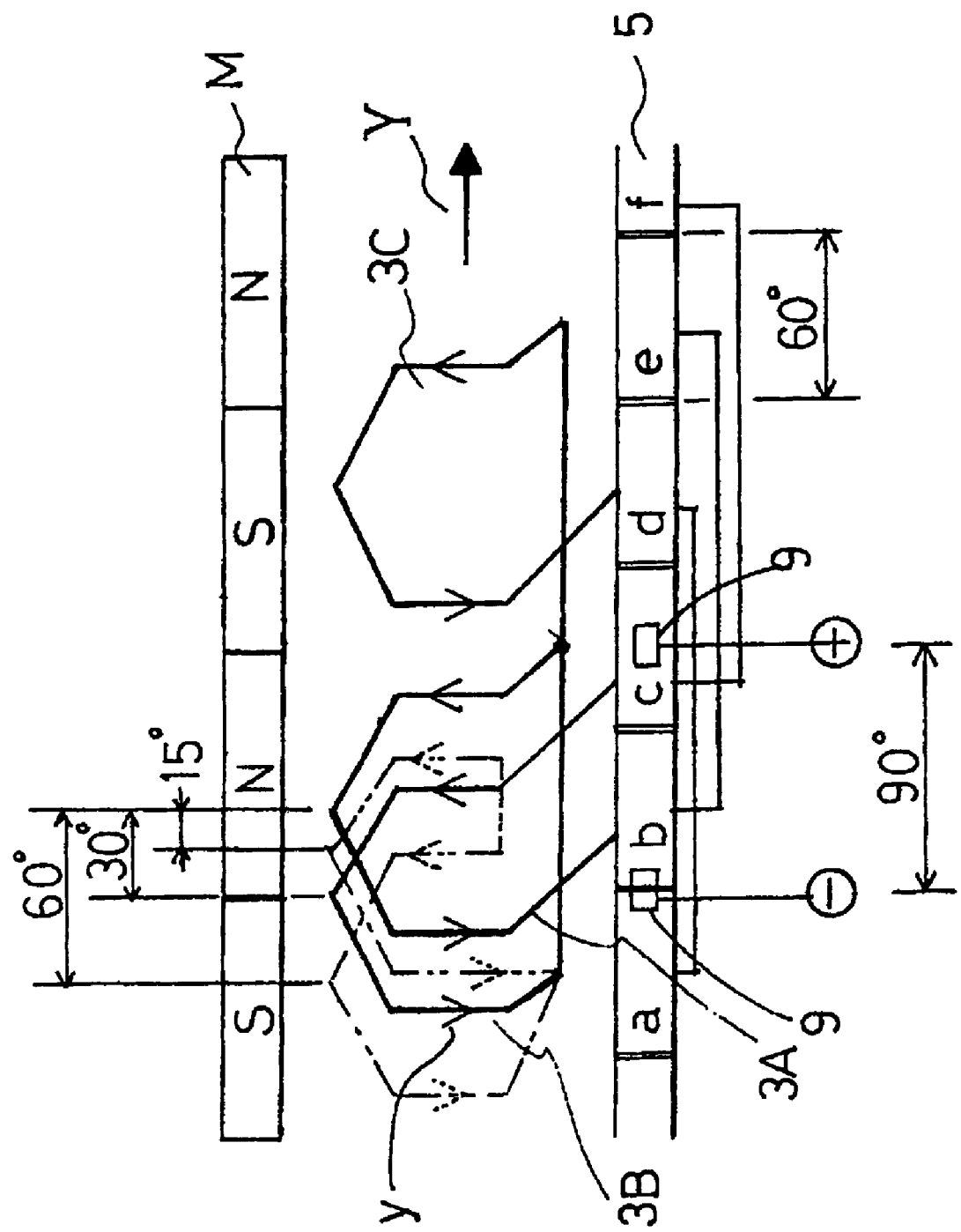
FIG. 4 is a drawing for explaining the movement of the motor of FIG. 3.

FIG. 4 explains the movements of the motor shown in FIG. 3; elements having the same position as commutator segment lands and the commutator segments not shown in the drawing will be explained using, for sake of convenience, the same indicators.

FIG. 4 shows a state when the negative brush 9 bridges commutator segment (a) and commutator segment (b), that is, a state where, due to a current supplied from the positive brush 9 via the commutator segment (c) and flowing in the direction of the arrow y through the effective conductor portion of all the coils, in accordance with the magnetic poles of the magnet M lacing the coils and in accordance with Fleming's left-hand rule, the generated power is generated so as to move in the same direction (i.e., the direction indicated by the arrow Y).

In such a case, the amount of eccentricity is reduced due to the movement of the second air-core armature coil; the position at which the second air-core armature coil is overlapped can have, as described above, an arrangement pitch angle of between 15° and 60°, as indicated by the broken lines.

However, in consideration of balance between eccentricity amount and generated torque, this angle is preferably between 30° and 40°.

With such a configuration, the neutral zone of the magnet M does not need to be expanded, and because no matter what position the rotor stops at, there is no reverse torque component, activation is facilitated, and because there is no sacrifice of the effective cross sectional area of the magnet, efficiency is high.

The opening of the casing 7 and the outer periphery of the bracket 8 are attached to each other by laser welding, and movement in the radial direction is restrained.

Therefore, the magnet M floats above the bracket 8 and is also separated from the power supply sheet F; thus heat is not easily conducted. This power supply sheet F is a flexible power supply member to which the brush 9 has been attached by soldering, a portion of which is lead out from the side of the casing 7 and is connected to an instrument side printed wiring board P (described below) at a position different from the attachment leg (described below) at time of reflow soldering.

Here, the side of the casing 7 is cut open and an attachment leg 7*a* protrudes from the side; a lower part thereof is mounted on the instrument side printed wiring board P such that a portion is embedded therein, and is attached thereto by reflow soldering at a position separate from the power supply sheet F.

E in the figures is a thrust-direction sliding member made from a polyester film; pushing contact force of the brush causes it to receive the eccentric rotor so as to be slidable along the casing.

In the above-described embodiment, the commutator was described as being tubular; however, a flat commutator such that the commutator segment of the printed wiring board is noble-metal plated with a metal alloy (containing cobalt to improve hardness) and an axial direction slide contact brush may of course be used.

Various other modifications may be made in the invention without departing from the technological essence and spirit thereof. Therefore, the above-described embodiments of the invention merely serve to illustrate the invention and should not be construed as limiting.

The technological scope of the invention is defined in the claims and is not restricted by the detailed description of the invention.

What is claimed is:

1. An axial air-gap vibration motor, comprising:
   an eccentric rotor comprising:
      a printed wiring board having a first side and an opposing second side;
      a commutator disposed on a first side and air-core armature connecting lands interconnected with the commutator;
      a bearing mounted to the printed wiring board at a center of rotation of the rotor;
      a first air-core armature coil disposed at the second side of the printed wiring board;
      a second aircore armature coil disposed at the second side of the printed wiring board and overlapping the first air-core armature coil in an axial direction of the rotor and shifted in a first rotational direction relative to the first air-core armature in a range of 15° to 60°;
      a third air-core armature coil disposed at the second side of the printed wiring board and so as to not overlap the first air-core armature coil and shifted in a second rotational direction, opposite said first rotational direction, relative to the first air-core armature at least about 120°, to not overlay said first and second air-core armature coils;
      the first, second and third air-core armature coils being eccentrically disposed at the second side of the printed wiring board relative to the center of rotation of the rotor and interconnected with the air-core armature connecting lands; and
      an eccentric weight disposed at the second side of the printed wiring board, eccentric with respect to the center of rotation of the rotor, and in a common radial plane with the second air-core armature coil and outside of said second air-core armature coil;
   a housing assembly including a casing and a bracket;
   a shaft supported in the housing assembly and rotatable supporting said rotor via said bearing;
   a magnet disposed in the housing assembly so as to define an axial air-gap in conjunction with the first, second and third air-core armature coils, and the first, second and third air-core armature coils having an angle section equal to a pitch angle of magnetization of the magnet; and
   a brush disposed in the housing assembly engaging the commutator so as to supply current to the first, second and third air-core armature coils.

2. The axial air-gap vibration motor according to claim 1, wherein the first and third air-core armature coils are disposed in a second common radial plane.

3. The axial air-gap vibration motor according to claim 2, the bearing is a sintered oil-impregnated bearing.

4. The axial air-gap vibration motor according to claim 3, wherein the casing has an step portion indented with respect to an outer surface of the casing, the shaft has a first end disposed in a hole in the step portion and welded to the casing from outside the housing assembly.

5. The axial air-gap vibration motor according to claim 4, wherein the bracket has a bracket hole and the shaft has a second end disposed in the bracket hole in the step portion and welded to the bracket from outside the housing assembly.

6. The axial air-gap vibration motor according to claim 2, wherein the eccentric weight overlaps the first and third air-core armature coils in the axial direction of the rotor.

7. The axial air-gap vibration motor according to claim 1, the bearing is a sintered oil-impregnated bearing.

8. The axial air-gap vibration motor according to claim 7, wherein the casing has an step portion indented with respect to an outer surface of the casing, the shaft has a first end disposed in a hole in the step portion and welded to the casing from outside the housing assembly.

9. The axial air-gap vibration motor according to claim 8, wherein the bracket has a bracket hole and the shaft has a second end disposed in the bracket hole in the step portion and welded to the bracket from outside the housing assembly.

10. The axial air-gap vibration motor according to claim 1, wherein the casing has an step portion indented with respect to an outer surface of the casing, the shaft has a first end disposed in a hole in the step portion and welded to the casing from outside the housing assembly.

11. The axial air-gap vibration motor according to claim 10, wherein the bracket has a bracket hole and the shaft has a second end disposed in the bracket hole in the step portion and welded to the bracket from outside the housing assembly.

12. The axial air-gap vibration motor according to claim 1, wherein the eccentric weight overlaps the first and third air-core armature coils in the axial direction of the rotor.

* * * * *